United States Patent [19]

Prowald

[11] 4,097,219
[45] Jun. 27, 1978

[54] SETTABLE REGULATOR DEVICE FOR GAS/AIR MIXTURE RATIOS

[75] Inventor: Oswald Prowald, Hoechen, Germany

[73] Assignee: Gerlach-Werke GmbH, Homburg, Germany

[21] Appl. No.: 632,785

[22] Filed: Nov. 17, 1975

[51] Int. Cl.² .................. F16K 31/365; F23N 1/02; G05D 11/02

[52] U.S. Cl. .............................. 431/90; 137/100; 236/15 BD; 251/31; 431/12

[58] Field of Search .......... 431/90, 12; 137/100; 236/15 BD; 92/48, 97; 251/31, 61.2

[56] References Cited

U.S. PATENT DOCUMENTS

| | | | |
|---|---|---|---|
| 1,558,529 | 10/1925 | Wunsch | 137/100 |
| 1,999,740 | 4/1935 | Schmidt et al. | 137/100 X |
| 2,217,610 | 10/1940 | Shannon | 122/448 A |
| 2,296,255 | 9/1942 | Bloom | 236/15 BD |
| 2,416,453 | 2/1947 | Mather et al. | 431/90 X |
| 2,504,304 | 4/1950 | Cowan | 137/100 |
| 2,879,056 | 3/1959 | Wagner | 137/100 X |
| 2,892,464 | 6/1959 | Glass | 92/97 X |
| 3,101,897 | 8/1963 | Vaughn | 431/90 X |
| 3,173,439 | 3/1965 | Griswold et al. | 92/97 X |
| 3,508,567 | 4/1970 | Kirk et al. | 431/90 X |

FOREIGN PATENT DOCUMENTS

| | | | |
|---|---|---|---|
| 1,526,046 | 1/1970 | Germany | 137/100 |
| 2,503,417 | 4/1975 | Germany | 137/100 |

*Primary Examiner*—Irwin C. Cohen
*Attorney, Agent, or Firm*—Larson, Taylor and Hinds

[57] ABSTRACT

A device for the setting and automatic regulation of the mixture ratio of a gas/air mixture for industrial furnaces comprises two coaxially-arranged diaphragm pressure gauges, connected in opposition, via a ratio setting mechanism, for the gas and the air, and a throttle member, controlled by the diaphragm displacement, in the gas or the air feed pipe. The two diaphragm pressure meters each are oppositely acted upon on only one side by the gas pressure or the air pressure respectively. The throttle member is controlled directly by the diaphragms. The diaphragm pressure gauges and the ratio setting mechanism together with the throttle member are designed as a structural unit.

15 Claims, 3 Drawing Figures

SETTABLE REGULATOR DEVICE FOR GAS/AIR MIXTURE RATIOS

This invention concerns a device for the setting and automatic regulation of the mixture ratio of a gas/air mixture for industrial furnaces with two coaxially-arranged diaphragm pressure gauges, connected in opposition via a ratio setting mechanism, for the gas and the air, and a throttle member, controlled by the diaphragm displacement, in the gas or the air feed pipe.

Devices of this kind are known from a treatise in the journal "Brennstoff-Wäerme-Kraft", 1953, No. 6, pages 202 to 207, and from German Offenlegungsschrift No. 1526046. The devices described therein work with the differential pressure of shutters or diaphragms inserted into the feed pipes of the two mixture components. Those sides of the diaphragm pressure gauges which are remote from the ratio adjusting mechanism are acted upon with the pressures taken directly in front of the shutters, and the other sides with the pressures occurring directly behind the shutters or diaphragms. The latter sides, facing the ratio adjusting mechanism, of the diaphragm pressure gauges are sealed in relation to this. The difference of the two diaphragm forces deflects a lever of the ratio setting mechanism which, via an electrical or a mechanical, such as hydraulic, adjusting mechanism, controls the throttle member arranged in the one of the two feed pipes for controlling the flow of gas or air.

The devices are, on account of their complicated construction, very expensive to purchase and maintain, and, even with careful maintenance, remain susceptible to trouble.

An object of the present invention is to provide a simple and sturdy device, which requires only slight maintenance, for the setting and automatic regulation, which keeps the gas/air ratio sufficiently constant over a wide flow range.

With this object in view the present invention provides a device for the setting and automatic regulation of the mixture ratio of a gas/air mixture for industrial furnaces, comprising two coaxially-arranged diaphragm pressure gauges, connected in opposition via a ratio setting mechanism, for the gas and the air, and a throttle member, controlled by the diaphragm displacement, in the gas or the air feed pipe, the two diaphragm pressure meters each being oppositely acted upon on only one side by the gas pressure or the air pressure respectively, and the throttle member being controlled directly by the diaphragms, the diaphragm pressure gauges and the ratio setting mechanism together with the throttle member being designed as a structural unit.

This device does not work with the differential pressure of shutters, but with the full gas or air pressure, preferably the one in the manifolds, in which connection sufficient adjusting force for the direct control of the throttle member is attained and by this means the combining of all the necessary components in a single, simple and small structural unit is made possible. The controlling action proves to be sufficiently proportional over a wide range, even when the entire burner capacity is adjusted merely by means of a single freely controllable throttle valve arranged in one of the feed pipes, preferably the air feed pipe, and the diaphragm-controlled throttle member, which is then arranged in the gas pipe, has to follow this adjustment by means of the device. With suitable design of the device and of the throttle member controlled by it, in addition the pressure reducer which was previously needed in the gas pipe, can be abolished. The gas and the air pressure acting upon the device can be tapped at all those places along the burner feed pipes where the ratio of the feed pipe gas pressure to the gas pressure acting upon the burners and the ratio of the feed pipe air pressure to the air pressure acting upon the burners respectively is approximately constant at all velocities of flow, that is to say where there are no special flow conditions.

Direct control of a throttle member by a diaphragm pressure gauge is known from U.S. Pat. No. 2,217,610 and German Offenlegungsschrift No. 1751350. The U.S. Patent describes a comparatively heavy device with a diaphragm pressure capsule which is acted upon on the one side with oil pressure and on the other side with steam pressure, and a constant lever force directed contrary to the steam pressure. The device can basically maintain no predetermined pressure ratio upon a change in the absolute pressures, but a constant pressure difference, which in addition can be adjusted only in one direction; also in other respects the device is not comparable to the new device. The device in accordance with the German Offenlegungsschrift is, just like the device of the invention, a gas/air stream proportional regulator, with the exception that the direct control of two valves is of different construction. In the air feed pipe and the gas feed pipe the usual shutters are provided, furthermore two separate diaphragm pressure gauges and valves, arranged at different points, and in the conventional manner a pressure reducer are needed.

A particularly advantageous development of the invention consists in that the two diaphragm pressure gauges are acted upon on their sides remote from the ratio adjusting mechanism and have, on their other sides, diaphragm pressure thrust bolts extending freely towards the ratio setting mechanism. The forces otherwise consumed for seals on the diaphragm pressure bolts thereby become free and increase the adjusting force.

The invention will be described further, by way of example, with reference to the accompanying drawings, in which.

Figure 1:
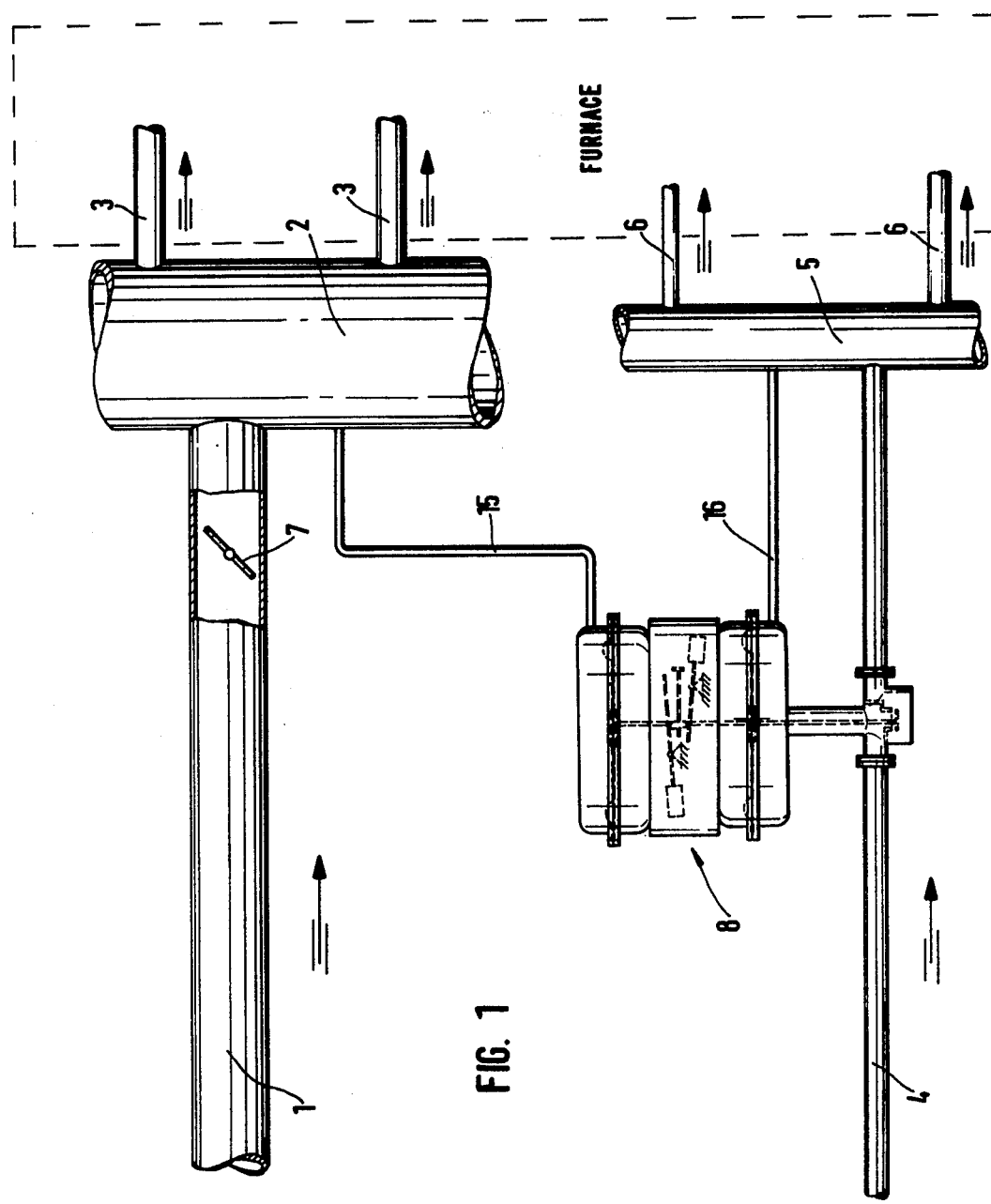
FIG. 1 shows, in schematic broken-away representation an installation for supplying an industrial furnace with a gas/air mixture.

In FIG. 1 of the drawings there is shown a feed pipe 1 for combustion air, an air distributor 2 connected thereto, air pipes 3 leading from the distributor 2 to individual burners of a furnace (not shown), a gas feed pipe 4, a gas distributor 5 connected thereto, and gas pipes 6 leading from the distributor 5 to the burners of the furnace. Incorporated into the air feed pipe 1 is a throttle valve 7 and incorporated into the gas feed pipe 4 is a settable regulator device, designated generally by the numeral 8, in accordance with the invention, the device 8 preferably being arranged with its axis substantially vertical.

Figure 2:
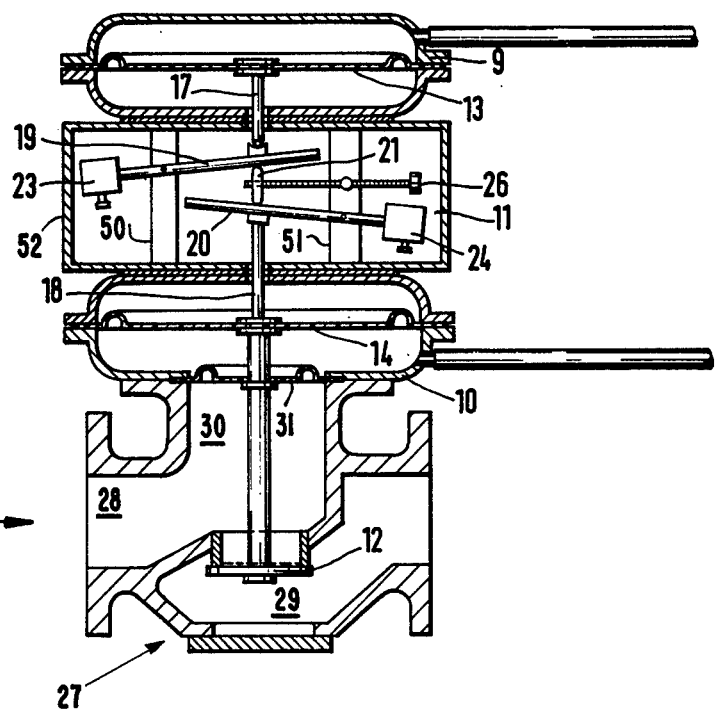
FIG. 2 shows, in vertical section, a device, to be incorporated into the installation shown in FIG. 1, in accordance with the invention.
Figure 3:
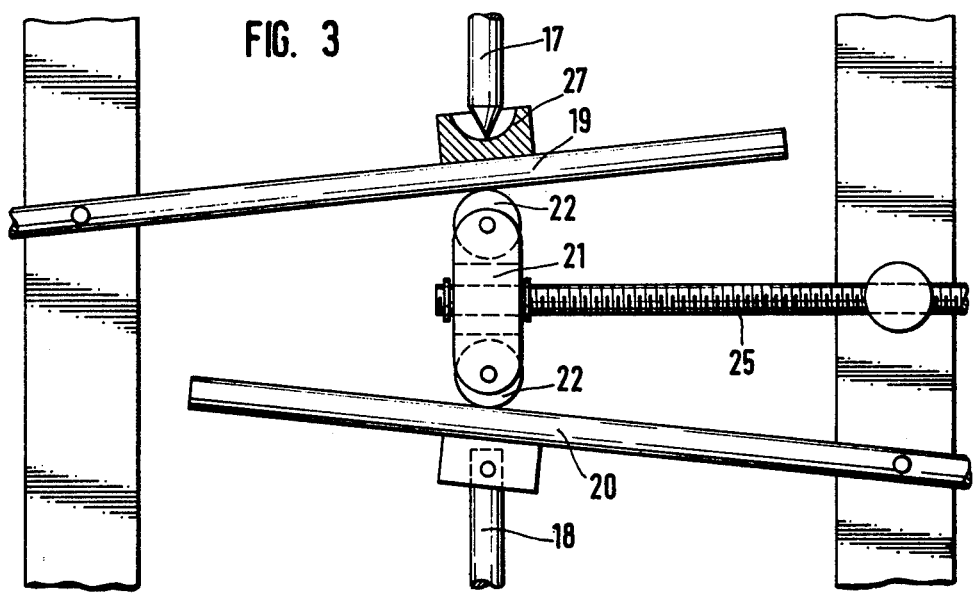
FIG. 3 shows a partial detail from FIG. 2 on a larger scale.

As is more evident from FIG. 2 of the drawings, this device 8 comprises two diaphragm pressure gauges 9, 10, forming a measuring mechanism, for the two mixture components and a ratio setting mechanism 11 arranged between the pressure meters 9, 10. The parts 9, 10 and 11, and valve member 12 for controlling the gas flow, are combined into a single unit in that, of two pressure gauge diaphragms 13, 14 of the measuring mechanism, the diaphragm 14 is mechanically connected directly to the adjusting valve member 12 and the diaphragm 13 is indirectly connected to valve member 12 via the ratio setting mechanism 11. The diaphragms 13, 14 of the pressure gauges 9, 10 are opposingly acted on only one side, so that the two pressure meters 9, 10 supplement each other to form a pressure difference gauge. The parts of this subdivided pressure difference meter, whilst avoiding the use of any orifice restrictors, are co-ordinated to one another most accurately, in the air and gas feed pipes 1 and 4, connected via connection lines 15, 16 (see FIG. 1) to the distributors 2, 5 of the two mixture components, wherefrom, as a result of the comparatively high pressure in these distributors, correspondingly large adjusting forces emerge. The said unilateral opposing action of the two pressure gauge diaphragms 13, 14 affords the possibility of conducting the thrust bolts 17, 18 of these diaphragms freely out of the pressure gauges 9, 10 on the diaphragm sides thereof not acted upon by the mixture components. In this way complicated and sensitive sliding guidances as well as seals are economised. At the same time, however, it is also achieved that the pressure thrust bolts 17, 18 have a transverse mobility which is significant for the operation of the interposed ratio setting mechanism 11. The ratio setting mechanism 11 consists of a lever system having manually-adjustable force/path ratios, advantageously — as shown — of two individual levers 19, 20, which are connected to the diaphragms 13, 14 respectively of the pressure gauges 9, 10 via the thrust bolts 17, 18 thereof and to one another via an abutment 21, supported so as to be longitudinally displaceable between them, for permitting opposing swing movements. Levers 19 and 20 are pivotably mounted on supports 50, 51, respectively, within a housing 52 containing ratio settable mechanism 11. The connection between the diaphragm thrust bolt 18 and the lever 20 consists of a hinge connection, whereas the connection between the diaphragm thrust bolt 17 and the lever 19 is provided in that the thrust bolt is journalled on points with its end in a spherical depression 27 of a lever-fast bearing. In this way a friction-free force transmission from the diaphragm thrust bolt 17 to the lever 19 of the ratio setting mechanism 11 is achieved. Rollers 22 pivotally mounted in the abutment 21 are bearings of the two levers 19, 20. They reduce the friction between the levers 19, 20 and the abutment or counter-bearing 21 to a minimum and thus increase the sensitivity of the device and therewith also the accuracy of its control action. The abutment 21 is seated on the one end of a threaded spindle 25 mounted so as to be slidable in the housing of the ratio setting mechanism 11. The parts 21 and 25 together form the ratio control slide, which is supported by support 51. By actuation of this ratio slide through twisting of the spindle 25 by means of a handwheel 26 fastened to its other end, the abutment 21 and therewith the bearing points of the two levers 19, 20 can be displaced so as to vary the force ratio of the two diaphragms 13, 14 and thereby the apparatus be set to another mixture ratio. A scale on one of the two levers 19, 20 (not shown) can be provided for the indication and facilitation of the ratio pressure adjustment. A control action of the device could be impaired by the weights of the moving parts of the device which are connected to the individual levers 19, 20 of the ratio setting mechanism, such as the diaphragms 13, 14, the diaphragm thrust bolts 17, 18, the adjusting member parts and also the levers 19, 20 themselves. Therefore all these weights are compensated by counter-weights 23, 24 mounted adjustably on the levers 19, 20, so that the arrangement of the compensating counter-weights 23, 24 on the levers 19, 20 is such that both of these compensating weights are effective in the direction of closure of the throttle member 12.

It should be noted that regulator device 8, as shown in FIG. 2, includes a section, generally designated 27, adapted to be connected to gas feed pipe 4 between the source of gas and gas distributor 5. Section 27 contains a first portion 28 adapted to be connected to the section of gas feed pipe 4 coming from the source of gas, a second portion 29 adapted to be connected to the section of gas feed pipe 4 leading to gas distributor 5, and a third portion 30 which connects portion 28 to portion 29 and is operatively associated with diaphragm pressure gauge 10. The flow of gas from portion 28 to portion 30 is not regulated while the flow from portion 30 to portion 29 is regulated by valve member 12. Further, portion 30 is separated from diaphragm pressure gauge 10 by a pressure gauge diaphragm 31 which is attached to thrust bolt 18. Diaphragm 31 exerts a force on thrust bolt 18 which is counter to that exerted by gas pressure acting on valve member 12. It will be readily recognized that this counter force, because it is developed by the same gas pressure, is always in proportion to the force acting on valve member 12. The forces will be equal if the size of diaphragm 31 and the cross section of valve member 12 are equal.

With regard to the operation of the device in accordance with the invention, which emerges of its own accord from the above description and the drawings, or can be deduced therefrom, let it be mentioned supplementarily merely that an air impulse over the diaphragm 13 of the pressure gauge 9 causes a force in the direction of the throttle member 12, which force opens the throttle member 12 until there occurs behind the throttle member a pressure which then builds up in the pressure gauge 10 under the diaphragm 14 to provide a counterforce which stabilizes or closes the throttle member 12. The ratio setting mechanism 11 affords the possibility of presetting different pressures in the diaphragm pressure gauges 9, 10 and has the result that the throttle member 12 adheres to the preset pressure ratio over the entire regulation range.

A substantial advantage of the device in accordance with the invention can be seen in that it is not only effective as an apparatus for the setting and automatic regulation of adjustable mixture ratios, but at the same time also carries out the function of a pressure reducer, connected prior to the consumers, for the automatic maintenance of a constant supply pressure. This additional function of the device of the invention is ensured by a suitable design of the throttle member 12.

What we claim is:

1. A device for setting and automatically regulating the mixture ratio of a mixture of first and second gases supplied to an industrial furnace comprising:
    (a) a first diaphragm pressure gauge comprising a first diaphragm mounted in a first housing;
    (b) a second diaphragm pressure gauge having a second diaphragm mounted in a second housing; said second diaphragm pressure gauge being coaxial with said first diaphragm pressure gauge;

(c) an adjustable gas ratio setting mechanism for setting the ratio of said first and second gases supplied to said furnace and disposed between said first and second diaphragm pressure gauges;

(d) first conduit means for connecting one side only of said first diaphragm pressure gauge with a supply of a first gas for a furnace, said one side being remote from said gas ratio setting mechanism;

(e) second conduit means for connecting one side only of said second diaphragm pressure gauge with a supply of a second gas for a furnace, said one side being remote from said gas ratio setting mechanism;

(f) a first member mounted on said first housing for movement with said first diaphragm and extending freely from said first diaphragm pressure gauge to said gas ratio setting mechanism;

(g) a second member mounted on said second housing for movement with said second diaphragm and extending freely from said first diaphragm pressure gauge to said gas ratio setting mechanism;

(h) means for operatively connecting said gas ratio setting mechanism and said first and second members for movement together;

(i) first gas valve means comprising a body through which a first gas is supplied to a furnace and a valve member moveable in said body to regulate the flow of a first gas therethrough;

(j) valve actuating means for actuating said valve member comprising an actuating arm operatively connected to said first diaphragm on the side thereof remote from said gas ratio setting mechanism for movement with said first diaphragm and connected to said valve member such that said valve member is moved by movement of said first diaphragm.

(k) a third diaphragm mounted on said valve body and positioned to be acted on one side thereof by a first gas regulated by said valve member, and the other side of said third diaphragm being open to said remote side of said first diaphragm pressure gauge, said other side being positioned to be acted on by a supply of a first gas supplied by said first conduit means; and (l) means operatively connecting said third diaphragm and said valve actuating arm for movement therewith whereby a change in pressure in a first gas supplied to said valve body and acting on said valve member is opposed by such change in pressure acting on said third diaphragm.

2. A device according to claim 1 wherein said first diaphragm pressure gauge is located vertically with respect to said second diaphragm pressure gauge.

3. A device according to claim 2 wherein said gas ratio setting mechanism is disposed co-axially between said first and second diaphragm pressure gauges.

4. A device according to claim 1 wherein the gas ratio setting mechanism comprises a lever system and means for adjusting force/path ratios.

5. A device according to claim 4 wherein the gas ratio setting mechanism comprises two levers which are connected to the diaphragms via said first and second members and to one another via a counter-bearing and means for displacing said bearing longitudinally between said two levers for opposing swing movements.

6. A device according to claim 5 wherein the counter-bearing has pivotally-mounted rollers providing bearings for abutting the two levers.

7. A device according to claim 6 wherein the weight of the levers as well as the moving parts connected thereto are compensated by counter-weights adjustably mounted on the levers.

8. A device according to claim 7 wherein said counter-weights situated on the levers are effective to urge closure of the valve member.

9. A device according to claim 1 wherein said valve body is mounted on said first diaphragm pressure gauge on the side thereof remote from said gas ratio setting mechanism and is vertically aligned therewith.

10. A device according to claim 9 wherein said third diaphragm is mounted in an opening communicating said valve body and the side of said first diaphragm pressure gauge remote from said gas ratio setting mechanism.

11. A device according to claim 10 wherein said valve actuating arm comprises a member secured to said first diaphragm, said third diaphragm and said valve member.

12. In an industrial furnace for burning a mixture of fuel gas and air comprising a gas distributor, gas supply conduit means for supplying gas to said gas distributor, an air distributor, air supply conduit means for supplying air to said air distributor, and means for setting and automatically regulating the mixture of gas and air burned in the furnace, the improvement wherein the gas and air mixture setting and automatically regulating device comprises a device according to claim 19, wherein said first conduit means is connected to said gas distributor and wherein said second conduit means is connected to said air distributor.

13. An improved industrial furnace according to claim 12 wherein said valve body is positioned in said gas supply conduit means.

14. An improved industrial furnace according to claim 13 wherein said air supply conduit means includes a freely controllable throttle valve.

15. An improved industrial furnace according to claim 13 wherein the gas supply conduit is free of a pressure reducer upstream of said valve body.

* * * * *